United States Patent
Mizota

(10) Patent No.: US 12,481,846 B2
(45) Date of Patent: Nov. 25, 2025

(54) INFORMATION READING SYSTEM, METHOD FOR SETTING SCANNER SYSTEM, AND METHOD FOR SETTING INFORMATION READING SYSTEM

(71) Applicant: KEYENCE CORPORATION, Osaka (JP)

(72) Inventor: Tokihiko Mizota, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 168 days.

(21) Appl. No.: 18/409,115

(22) Filed: Jan. 10, 2024

(65) Prior Publication Data

US 2024/0273315 A1    Aug. 15, 2024

(30) Foreign Application Priority Data

Feb. 10, 2023   (JP) ................... 2023-019190

(51) Int. Cl.
*G06K 7/10*          (2006.01)
*G06K 7/14*          (2006.01)

(52) U.S. Cl.
CPC ....... *G06K 7/10198* (2013.01); *G06K 7/1486* (2013.01)

(58) Field of Classification Search
CPC .... G06K 7/10198; G06K 7/1486; G06K 7/10; H04N 1/04; H04L 61/5007
See application file for complete search history.

(56) References Cited

U.S. PATENT DOCUMENTS

| | | | |
|---|---|---|---|
| 7,273,179 B2 * | 9/2007 | Anson | H04L 41/0813 235/462.46 |
| 7,537,164 B2 | 5/2009 | Joseph et al. | |
| 7,852,519 B2 | 12/2010 | Meier et al. | |
| 8,498,665 B2 * | 7/2013 | Ito | G06Q 30/02 455/418 |
| 8,938,256 B2 * | 1/2015 | Logan | G08B 13/1427 455/457 |
| 9,298,958 B1 * | 3/2016 | Amir | H04W 52/0216 |
| 2002/0124111 A1 * | 9/2002 | Desai | H04L 12/2856 348/E7.07 |

(Continued)

OTHER PUBLICATIONS

Related co-pending application: U.S. Appl. No. 18/409,028, filed Jan. 10, 2024, counterpart Japanese Patent Application No. 2023-019186.

(Continued)

*Primary Examiner* — Curtis J King
(74) *Attorney, Agent, or Firm* — WHDA, LLP

(57) ABSTRACT

It is possible to easily execute a setting for reading information included in a target to be read without requiring a high-level technique related to a network. An IP address assignment unit that assigns private IP addresses to a configuration application for setting an imaging parameter, a decoding parameter, or a communication parameter and a client computer is provided. Then, when a communication system is connected to the client computer via a first communication interface (Steps S101 and S104), private IP addresses on the same private network are assigned to the client computer and a web server, respectively, by the IP address assignment unit (Step S105).

12 Claims, 13 Drawing Sheets

(56) References Cited

U.S. PATENT DOCUMENTS

| | | | | |
|---|---|---|---|---|
| 2004/0157625 | A1* | 8/2004 | Gheorghiu | H04W 4/029 455/456.2 |
| 2005/0153729 | A1* | 7/2005 | Logan | H04M 1/6505 455/550.1 |
| 2006/0006231 | A1* | 1/2006 | Anson | H04L 41/0813 235/462.46 |
| 2008/0039126 | A1* | 2/2008 | Stevens | H04L 67/12 455/500 |
| 2012/0077518 | A1* | 3/2012 | Logan | H04M 1/656 455/456.1 |
| 2012/0230235 | A1* | 9/2012 | Perras | H04L 69/14 370/310 |
| 2012/0326874 | A1* | 12/2012 | Kwak | A01K 11/006 340/573.3 |
| 2013/0016668 | A1* | 1/2013 | Zhao | H04L 61/2517 370/329 |
| 2013/0222141 | A1* | 8/2013 | Rhee | G16H 50/80 340/573.3 |
| 2014/0085058 | A1* | 3/2014 | Horst | G06K 7/10227 340/10.51 |
| 2014/0374475 | A1* | 12/2014 | Kallfelz | H01M 10/4285 235/375 |
| 2016/0042032 | A1* | 2/2016 | Rosati | H04L 9/3247 235/375 |
| 2016/0209831 | A1* | 7/2016 | Pal | B29B 13/065 |
| 2016/0245279 | A1* | 8/2016 | Pal | F04B 51/00 |
| 2016/0245686 | A1* | 8/2016 | Pal | G01M 13/045 |
| 2016/0313216 | A1* | 10/2016 | Pal | B23Q 17/0971 |
| 2016/0330779 | A1* | 11/2016 | Neumann | H04W 76/14 |
| 2018/0330293 | A1* | 11/2018 | Kulkarni | G06K 7/10366 |
| 2019/0178978 | A1* | 6/2019 | Martinez | B64G 4/00 |
| 2020/0351986 | A1* | 11/2020 | Huegle | H04L 12/2814 |
| 2021/0111580 | A1 | 4/2021 | Barkan et al. | |
| 2021/0306175 | A1* | 9/2021 | Aguirre | H04B 17/14 |
| 2023/0223142 | A1* | 7/2023 | Joao | H04N 7/141 705/2 |
| 2024/0095400 | A1* | 3/2024 | Poe | G06F 11/0766 |

OTHER PUBLICATIONS

Related co-pending application: U.S. Appl. No. 18/409,075, filed Jan. 10, 2024, counterpart Japanese Patent Application No. 2023-019189.

Related co-pending application: U.S. Appl. No. 18/409,229, filed Jan. 10, 2024, counterpart Japanese Patent Application No. 2023-019188.

\* cited by examiner

FIG. 6

| BANK B | IMAGING PARAMETER Pa | DECODING PARAMETER Pb |
|---|---|---|
| B(1) | Pa(1) | Pb(1) |
| B(2) | Pa(2) | Pb(2) |
| B(3) | Pa(3) | Pb(3) |
| ... | ... | ... |
| B(N) | Pa(N) | Pb(N) |
| ... | ... | ... |
|  |  |  |

INFORMATION READING SYSTEM, METHOD FOR SETTING SCANNER SYSTEM, AND METHOD FOR SETTING INFORMATION READING SYSTEM

CROSS-REFERENCE TO RELATED APPLICATIONS

The present application claims foreign priority based on Japanese Patent Application No. 2023-019190, filed Feb. 10, 2023, the contents of which are incorporated herein by reference.

BACKGROUND OF THE INVENTION

1. Technical Field

The invention relates to a technique for performing a setting for reading information included in a target to be read by scanning the target to be read to generate scan data and decoding the scan data.

2. Description of the Related Art

US 2006/0006231 discloses a data reading device equipped with a web server capable of executing a configuration application that performs settings necessary for the data reading device to read a code.

That is, the web server receives an instruction from a web browser used in a client device such as a computer, and sets a content indicated by the instruction by the configuration application.

However, in the above-described technique, it is necessary to perform network settings such as an IP address in accordance with network environments of users in order to establish communication between the web browser of the client device and the web server mounted on the data reading device. Such work has a problem that it is extremely difficult for a user with a low-level technique related to the network.

SUMMARY OF THE INVENTION

The invention has been made in view of the above problem, and an object thereof is to enable a setting for reading a code to be easily executed without requiring a high-level technique related to a network.

According to one embodiment of the invention, an information reading system includes: a scanner system including a scanning unit that scans a target to be read and generates scan data and a control unit that executes decoding of the scan data generated by the scanning unit; a setting system that performs a setting in the scanner system; a communication system including a first communication interface to be connected to an external computer; and a storage unit that stores a scan parameter for controlling the scanning unit, a decoding parameter related to the decoding to be executed on the scan data, or a communication parameter related to a result output of the decoding executed on the scan data. The setting system includes a web server that executes a configuration application for setting the scan parameter, the decoding parameter, or the communication parameter, and an IP address assignment unit that assigns an IP address on an identical network to each of the external computer and the web server when the communication system is connected to the external computer via the first communication interface. The web server is brought into a state of being capable of communicating with a web browser of the external computer via the first communication interface after the assignment of the IP address by the IP address assignment unit. The configuration application stores the scan parameter, the decoding parameter, or the communication parameter in the storage unit in response to an instruction received from the web browser via the first communication interface.

According to one embodiment of the invention, a method for setting a scanner system is a method for setting a scanner system that performs a setting using a setting system for a scanner system including a scanning unit that scans a target to be read and generates scan data and a control unit that decodes the scan data generated by the scanning unit, and includes: a step of assigning, by an IP address assignment unit, an IP address on an identical network to each of a web server and an external computer after a first communication interface of a communication system is connected to the external computer, the web server being capable of executing a configuration application that sets a scan parameter for controlling scanning by the scanning unit, a decoding parameter related to decoding to be executed on the scan data, or a communication parameter related to a result output of the decoding executed on the scan data; a step of bringing the web server into a state of being capable of communicating with a web browser of the external computer via the first communication interface after the assignment of the IP address by the IP address assignment unit; and a step of storing, by the configuration application, the scan parameter, the decoding parameter, or the communication parameter in a storage unit in response to an instruction received from the web browser via the first communication interface.

The invention (the information reading system and the method for setting a scanner system) configured as described above includes the IP address assignment unit that assigns the IP address to each of the configuration application for setting the scan parameter, the decoding parameter, or the communication parameter and the external computer. Then, when the communication system is connected to the external computer via the first communication interface, the private IP address on the same private network is assigned to each of the external computer and the web server by the IP address assignment unit. In this manner, the communication between the external computer and the web server is automatically established. As a result, the instruction can be transmitted from the web browser of the external computer to the configuration application of the web server to cause the configuration application to set the scan parameter, the decoding parameter, or the communication parameter.

In the invention configured as described above, it is possible to easily execute the setting for reading information included in a target to be read by scanning the target to be read to generate scan data and decoding the scan data without requiring the high-level technique related to the network.

BRIEF DESCRIPTION OF THE DRAWINGS

FIG. 6 is a view schematically illustrating a bank storing parameters;

DETAILED DESCRIPTION

Figure 1:
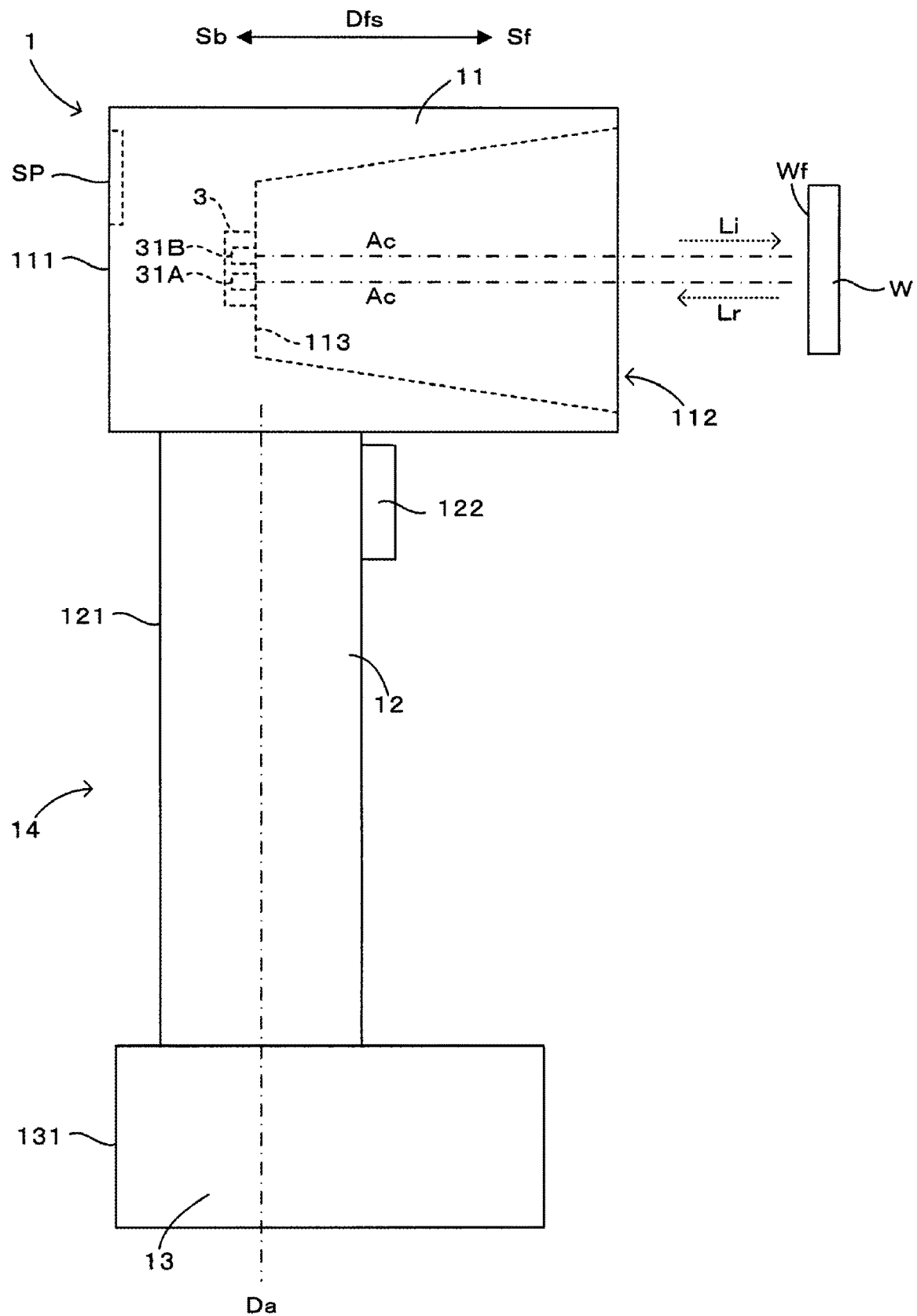
FIG. 1 is a side view schematically illustrating a configuration of a code reading device.
Figure 2:
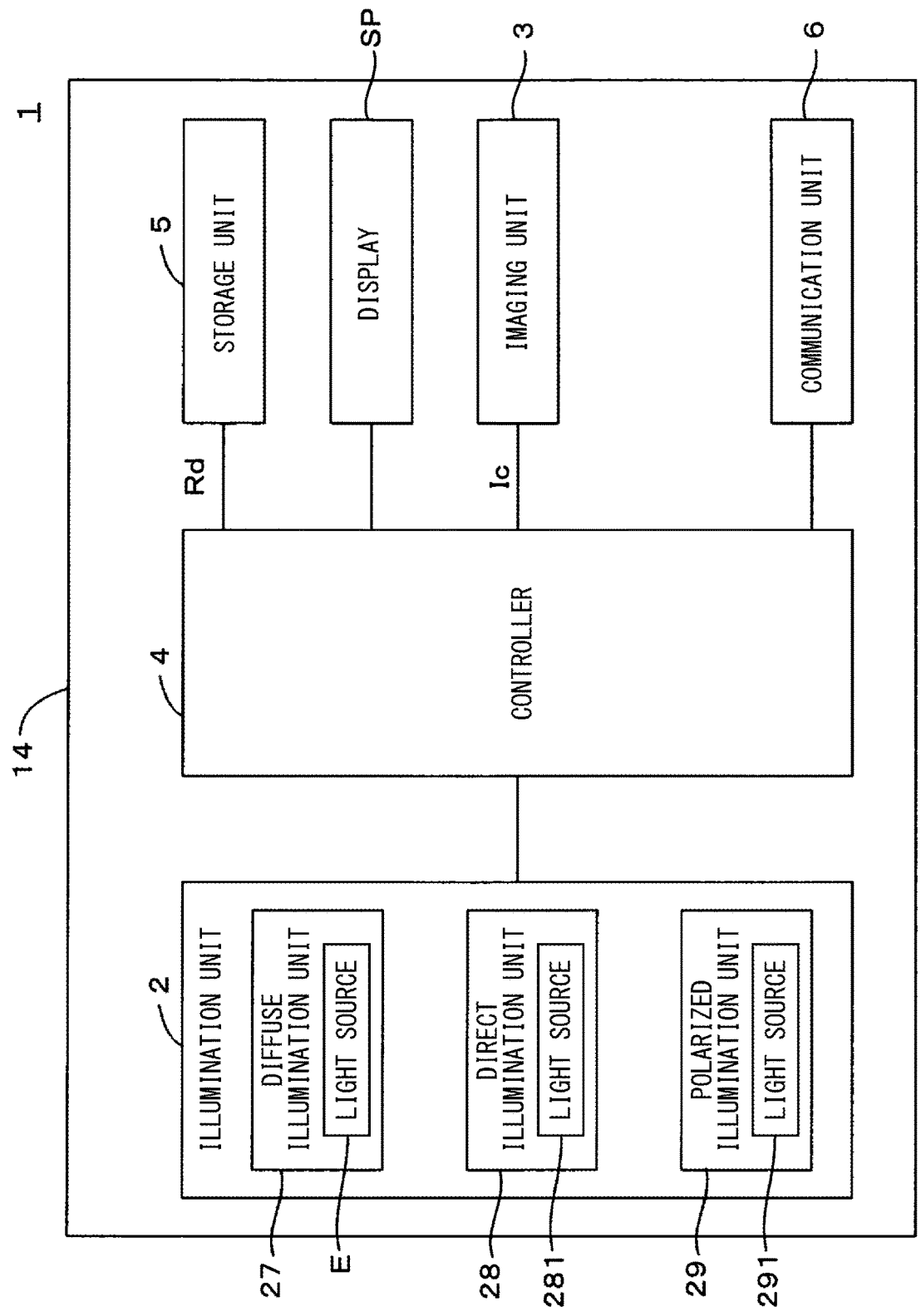
FIG. 2 is a block diagram schematically illustrating an electrical configuration of the code reading device of FIG. 1.

Hereinafter, an information reading system according to an embodiment of the invention will be described by taking code reading of barcode, a QR code (registered trademark), or the like as an example, but the invention is not particularly limited to the code reading. FIG. 1 is a side view schematically illustrating a configuration of a code reading device, and FIG. 2 is a block diagram schematically illustrating an electrical configuration of the code reading device of FIG. 1. Here, in a state where a code reading device 1 faces a surface Wf of a workpiece W in order to read a code attached to the surface Wf of the workpiece W by the code reading device 1, a front-rear direction Dfs is appropriately illustrated with a side closer to the workpiece W with respect to the code reading device 1 as a front side Sf and an opposite side of the workpiece W with respect to the code reading device 1 as a rear side Sb.

As illustrated in FIG. 1, the code reading device 1 includes a head 11, a grip 12, and a grip end 13. The grip 12 extends in an axial direction Da intersecting the front-rear direction Dfs between the head 11 and the grip end 13. In other words, the head 11 is provided at one end of the grip 12, and the grip end 13 is provided at the other end (end opposite to the one end) of the grip 12. The head 11 has a head body 111, the grip 12 has a grip body 121, the grip end 13 has a grip end body 131, and the head body 111, the grip body 121, and the grip end body 131 constitute a housing 14 that houses each unit incorporated in the code reading device 1. A user can carry the code reading device 1 by grasping the grip body 121 of the code reading device 1.

The head body 111 of the head 11 has an opening 112 opened to the front side Sf, and an arrangement panel 113 is provided at an end on the rear side Sb (in other words, the back side) of the opening 112. During code reading, the opening 112 faces the surface Wf of the workpiece W, and the arrangement panel 113 faces the surface Wf of the workpiece W through the opening 112. In addition, the head 11 includes an illumination unit 2, an imaging unit 3, and a display SP illustrated in FIG. 2. The illumination unit 2, the imaging unit 3, and the display SP are housed in the head 11. In particular, a part of the illumination unit 2 and the imaging unit 3 are provided on the arrangement panel 113.

The illumination unit 2 irradiates the surface Wf of the workpiece W with illumination light Li, and the imaging unit 3 captures an image of reflected light Lr from the surface Wf of the workpiece W with a camera 31A or 31B to generate a code image Ic. The illumination light Li is emitted from the illumination unit 2 to the surface Wf of the workpiece W through the opening 112, the reflected light Lr is generated as the illumination light Li is reflected from the surface Wf of the workpiece W, and the reflected light Lr is incident on the camera 31A or 31B of the imaging unit 3 from the surface Wf of the workpiece W through the opening 112.

The illumination unit 2 includes a diffuse illumination unit 27, a direct illumination unit 28, and a polarized illumination unit 29. The diffuse illumination unit 27 has a light source E, and diffuses light emitted from the light source E and irradiates the surface Wf of the workpiece W with the diffuse light. The direct illumination unit 28 includes a light source 281, and directly irradiates the surface Wf of the workpiece W with light emitted from the light source 281 without diffusing the light. The polarized illumination unit 29 includes a light source 291, polarizes light emitted from the light source 291, and irradiates the surface Wf of the workpiece W with the polarized light. Details of the illumination unit 2 will be described later.

The imaging unit 3 includes two cameras 31A and 31B. Each of the cameras 31A and 31B has a visual field, and collects light incident from the inside of the visual field on a condenser lens, which an objective lens, on an individual imaging element by the condenser lens to capture an image of the inside of the visual field. That is, each of the cameras 31A and 31B collects the reflected light Lr on the individual imaging element by the condenser lens facing the surface Wf of the workpiece W present in the visual field. The individual imaging element receives the reflected light Lr collected by the condenser lens to generate the code image Ic. Note that an optical axis Ac of each of the cameras 31A and 31B (that is, the optical axis Ac of the condenser lens of each of the cameras 31A and 31B) is parallel to the above-described front-rear direction Dfs.

The display SP is provided at an end portion on the rear side Sb of the head body 111 of the head 11, and displays various types of information on a screen for the user.

The grip 12 includes a trigger switch 122 provided on the front side Sf of the grip body 121. The user can operate the trigger switch 122 with a finger while gripping the grip body 121 with a hand.

In addition, the code reading device 1 includes a controller 4 that controls each unit of the code reading device 1, a storage unit 5 that stores data to be used or generated in the code reading device 1, and a communication unit 6 with respect to an external device. The controller 4, the storage unit 5, and the communication unit 6 are housed in the housing 14. The controller 4 is a processor, that is, a central processing unit (CPU). The storage unit 5 is a storage device such as a solid state drive (SSD). The communication unit 6 includes a main communication interface 831, a first communication interface 833, and a second communication interface 837 to be described later.

The controller 4 causes the illumination unit 2 to execute an illumination operation of irradiating the surface Wf of the workpiece W with the illumination light Li, and causes the imaging unit 3 to execute an imaging operation of receiving the reflected light Lr by the solid-state imaging element to generate the code image Ic. Furthermore, the controller 4 acquires the code image Ic generated by the imaging unit 3 and decodes the code image Ic. In this manner, code reading is executed by a series of operations such as the illumination operation by the illumination unit 2, the imaging operation by the imaging unit 3, and the decoding by the controller 4. For example, the controller 4 executes the code reading when sensing that the trigger switch 122 is operated by the user. A decoding result Rd which is a result of the code reading, that is, a result of the decoding of the code image Ic by the controller 4 is stored in the storage unit 5.

Figure 3:
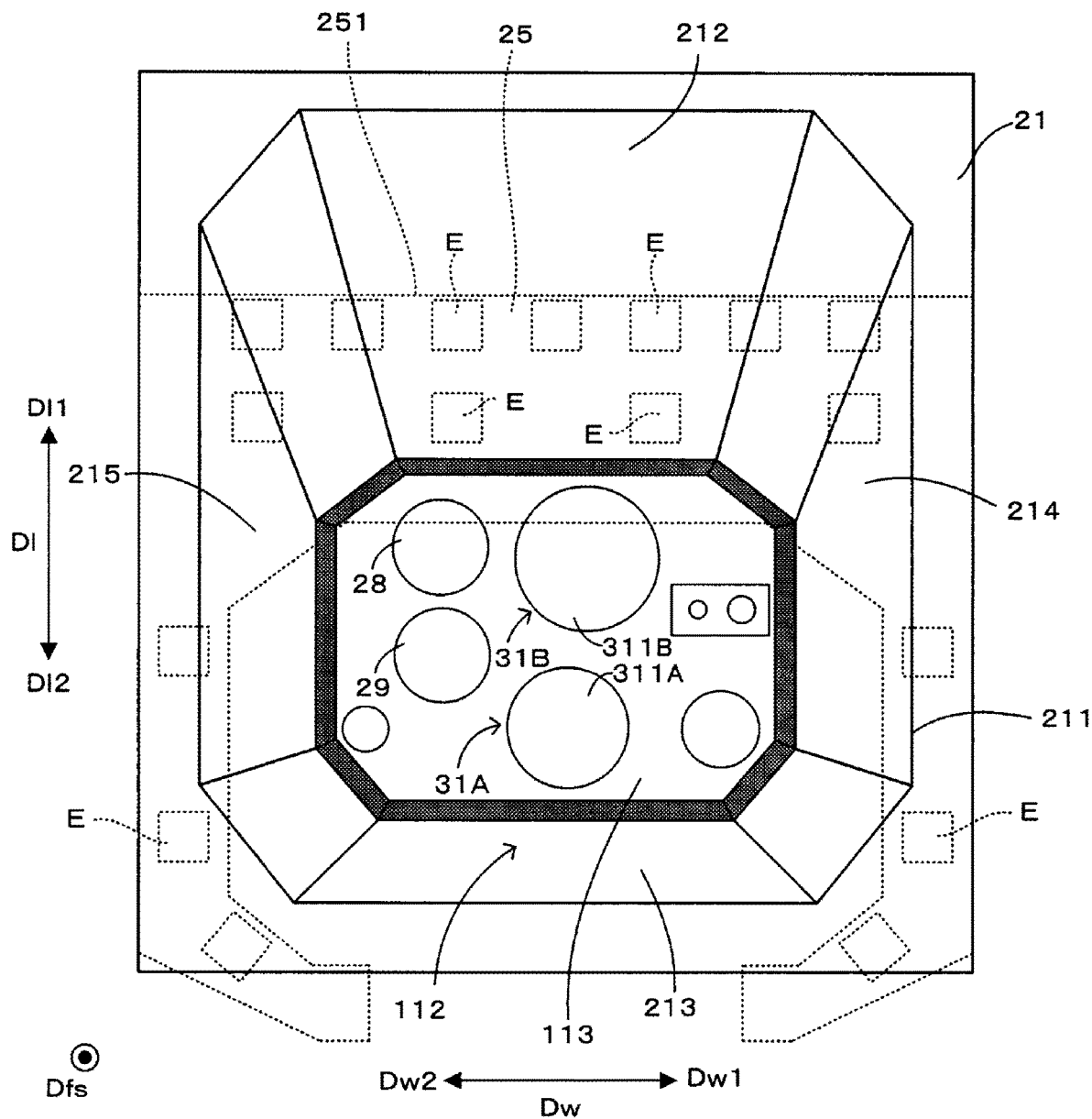
FIG. 3 is a front view schematically illustrating a diffuser provided in a head and an illumination substrate provided on a rear side of the diffuser.

Next, a configuration of the head 11, particularly a configuration of the illumination unit 2 provided in the head 11 will be described in detail. FIG. 3 is a front view schematically illustrating a diffuser provided in the head and an illumination substrate provided on the rear side of the diffuser. In FIG. 3, a length direction Dl and a width direction Dw are illustrated. Here, the length direction Dl and the width direction Dw are orthogonal to each other and are orthogonal to the front-rear direction Dfs. In addition, one side Dl1 in the length direction Dl (a side from the grip end 13 toward the head 11) and the other side Dl2 in the length direction Dl (a side opposite to the one side Dl1) are illustrated, and one side Dw1 in the width direction Dw and the other side Dw2 in the width direction Dw (a side opposite to the one side Dw1) are illustrated.

The illumination unit 2 includes a diffuser 21 and an illumination substrate 25 arranged on the rear side Sb of the diffuser 21 in the front-rear direction Dfs. The diffuser 21 forms a part of the head body 111 described above. Note that the illumination substrate 25 hidden by the diffuser 21 in the front view from the front side Sf in the front-rear direction Dfs is indicated by a broken line in FIG. 3.

The diffuser 21 has an opening defining portion 211 which is a wall surface surrounding the above-described opening 112 opened to the front side Sf. The opening defining portion 211 has a top diffusion plate 212 provided on the one side Dl1 of the opening 112 and a bottom plate 213 provided on the other side Dl2 of the opening 112 in the length direction Dl. Furthermore, the opening defining portion 211 includes a right diffusion plate 214 provided on the one side Dl1 of the opening 112 and a left diffusion plate 215 provided on the other side Dl2 of the opening 112 in the width direction Dw. End portions of the top diffusion plate 212 on both the sides in the width direction Dw are bent to the other side Dl2 toward the right diffusion plate 214 and the left diffusion plate 215. In addition, in the length direction Dl, an end portion of the right diffusion plate 214 on the other side Dl2 is bent to the other side Dw2 toward the bottom plate 213, and an end portion of the left diffusion plate 215 on the other side Dl2 is bent to the one side Dw1 toward the bottom plate 213.

The top diffusion plate 212, the right diffusion plate 214, and the left diffusion plate 215 diffuse light transmitted from the rear side Sb to the front side Sf, and emit the light to the front side Sf. Specifically, a back surface (light incident surface) on the rear side Sb of each of the top diffusion plate 212, the right diffusion plate 214, and the left diffusion plate 215 is roughened, and the light is diffused by the textured back surface. However, a configuration for causing the top diffusion plate 212, the right diffusion plate 214, and the left diffusion plate 215 to have a light diffusion function is not limited to roughening, and for example, the light diffusion function may be provided by processing these plates into milky white.

Each of the plates 212, 213, 214, and 215 defining the opening 112 has a tapered shape inclined with respect to the front-rear direction Dfs such that the area of the opening 112 in a cross section orthogonal to the optical axis Ac of the condenser lens 311A (FIG. 1) of the camera 31A increases toward the front side Sf in the front-rear direction Dfs. In other words, each of the plates 212, 213, 214, and 215 has a tapered shape inclined with respect to the front-rear direction Dfs so as to be separated from the optical axis Ac toward the front side Sf in the front-rear direction Dfs (an optical axis direction).

The illumination substrate 25 is arranged on the rear side Sb with respect to the plates 212, 213, 214, and 215 each having the tapered shape as described above. The illumination substrate 25 includes a substrate 251 and a plurality of light sources E arrayed on a surface of the substrate 251 on the front side Sf. The light source E is, for example, a light emitting diode (LED), and emits light to the front side Sf toward the top diffusion plate 212, the right diffusion plate 214, or the left diffusion plate 215. The light emitted from the light source E and incident on the top diffusion plate 212, the right diffusion plate 214, or the left diffusion plate 215 from the rear side Sb is diffused as passing through the diffusion plate 212, 214, or 215, and is emitted from the diffusion plate 212, 214, or 215 to the front side Sf.

That is, the light emitted from the light source E of the illumination substrate 25 passes through the diffuser 21 in the diffusion plates 212, 214, and 215. At this time, the light from the light source E is diffused by the diffuser 21 as passing through the diffuser 21. Diffuse light generated by diffusing the light by the diffuser 21 in this manner is emitted to the surface Wf of the workpiece W as uniform planar illumination light Li.

The above-described diffuse illumination unit 27 (FIG. 2) is configured using the diffuser 21 and the illumination substrate 25 as described above. Furthermore, as described above, the illumination unit 2 includes the direct illumination unit 28 that directly irradiates the surface Wf of the workpiece W with the light from the light source 281 without diffusing the light, and the polarized illumination unit 29 that irradiates the surface Wf of the workpiece W with light (P waves or S waves) obtained by polarizing the light from the light source 291. As illustrated in FIG. 3, the direct illumination unit 28 and the polarized illumination unit 29 are arranged on the arrangement panel 113.

Therefore, the controller 4 can selectively execute "diffuse illumination" in which the light source E of the diffuse illumination unit 27 is turned on to irradiate the workpiece W with the diffuse light, "direct illumination" in which the light source 281 of the direct illumination unit 28 is turned on to irradiate the workpiece W with the light from the light source 281 without diffusion, and "polarized illumination" in which the light source 291 of the polarized illumination unit 29 is turned on to irradiate the workpiece W with the polarized light.

As described above, the imaging unit 3 includes the two cameras 31A and 31B, and these cameras 31A and 31B are provided on the arrangement panel 113. Specifically, as illustrated in FIG. 3, the condenser lens 311A and a condenser lens 311B (objective lenses) of the camera 31A and the camera 31B are fitted into the arrangement panel 113. The camera 31A collects the reflected light Lr from the surface Wf of the workpiece W on a solid-state imaging element by the condenser lens 311A, and causes the solid-state imaging element to generate the code image Ic. Similarly, the camera 31B collects the reflected light Lr from the surface Wf of the workpiece W on a solid-state imaging element by the condenser lens 311B, and causes the solid-state imaging element to generate the code image Ic. The camera 31A is a high-resolution camera, whereas the camera 31B is a low-resolution camera, and the resolution of the camera 31A is higher than the resolution of the camera 31B. Therefore, the resolution of the code image Ic captured by the camera 31A is higher than the resolution of the code image Ic captured by the camera 31B. For example, in a case where image sensors included in the respective cameras have the equal number of pixels, the resolution of the camera 31A can be made higher than the resolution of the camera 31B by making a visual field of the camera 31A narrower than a visual field of the camera 31B.

Figure 4:
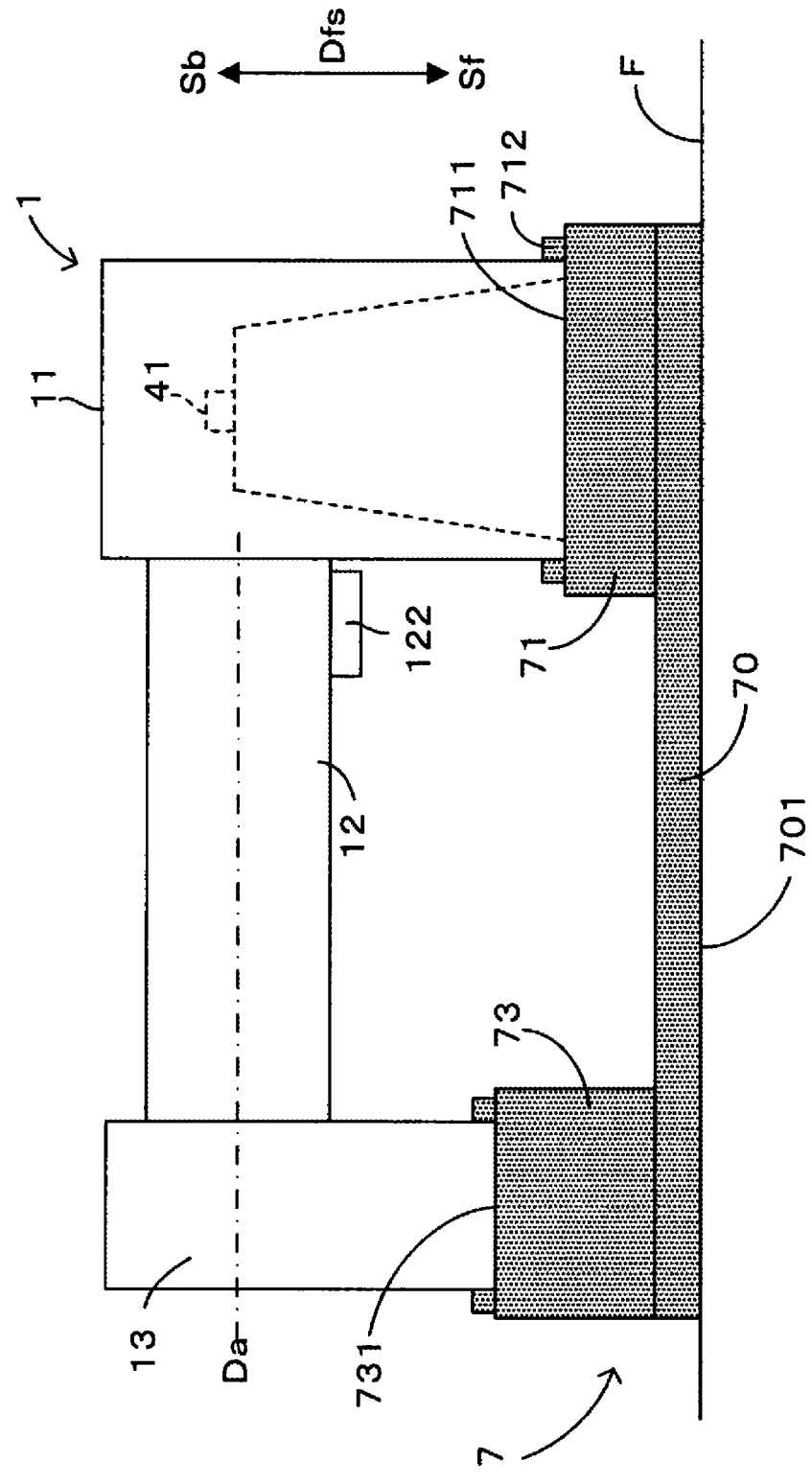
FIG. 4 is a view schematically illustrating an example of a stand.

In addition, the code reading device 1 is provided with a stand 7 for placement of the code reading device 1 (FIG. 4). FIG. 4 is a view schematically illustrating an example of the stand. The stand 7 is used in a state of being installed on an installation surface F which is a horizontal or vertical plane. The stand 7 has a base portion 70 extending parallel to the installation surface F, and a contact surface 701 provided on the base portion 70 to be parallel comes into contact with the installation surface F. In addition, the stand 7 also includes a head placement portion 71 and a grip end placement portion 73 which face the head 11 and the grip end 13 of the code reading device 1 placed on the stand 7, respectively. In other words, the head placement portion 71 is provided at one end portion of the base portion 70, and the grip end placement portion 73 is provided at the other (opposite to the one) end portion of the base portion 70.

The head placement portion 71 includes a head facing surface 711 facing the head 11 of the code reading device 1 placed on the stand 7 from the front side Sf, and a wall portion 712 erected from a peripheral edge of the head facing surface 711. The wall portion 712 positions the head 11 placed on the head placement portion 71 so as to face the head facing surface 711.

The grip end placement portion 73 includes a grip end facing surface 731 facing the grip end 13 of the code reading device 1 placed on the stand 7 from the front side Sf, and a wall portion 732 erected from a peripheral edge of the grip end facing surface 731. The wall portion 732 positions the grip end 13 placed on the grip end placement portion 73 so as to face the grip end facing surface 731.

Figure 5:
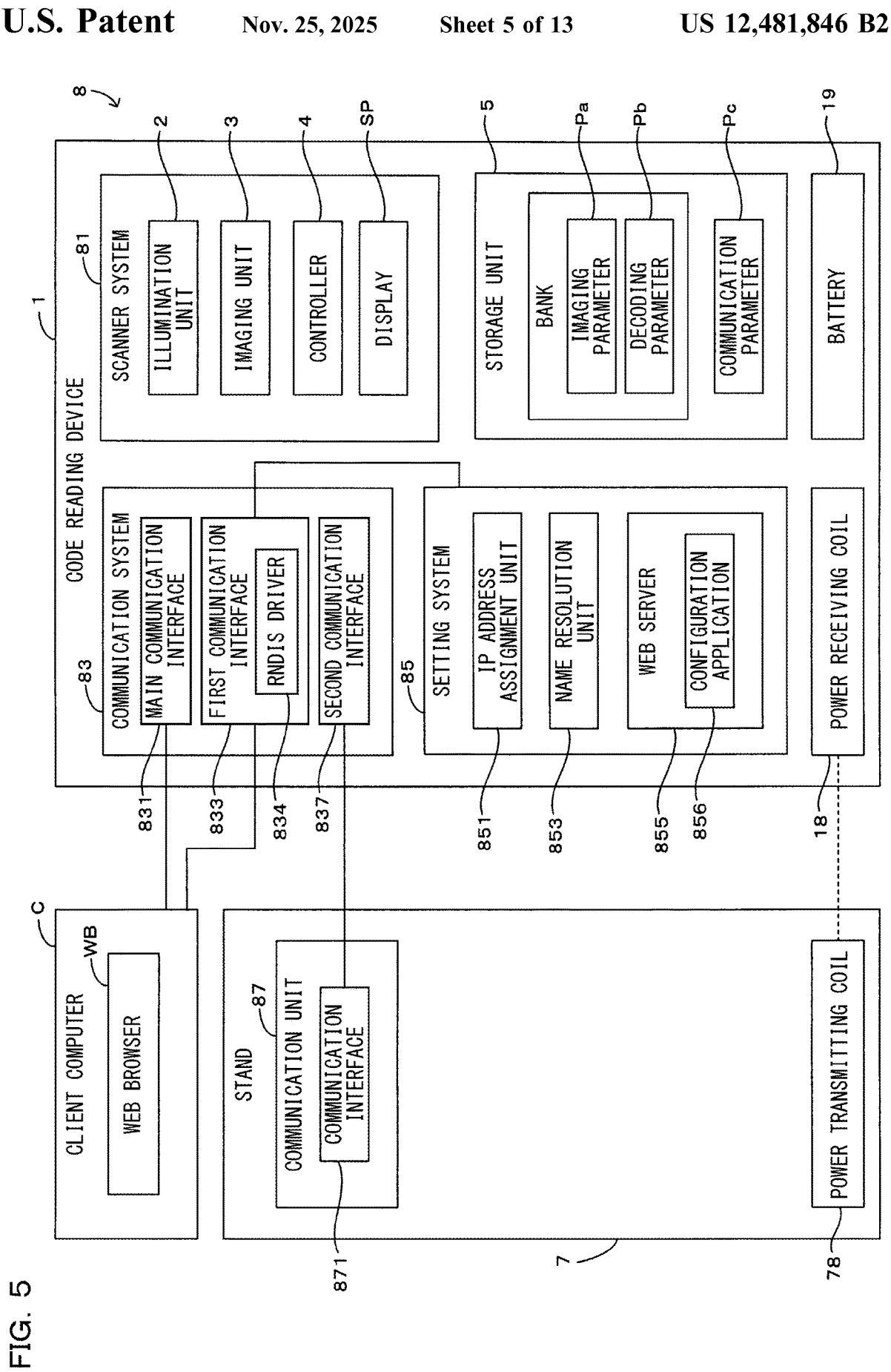
FIG. 5 is a block diagram illustrating a first example of electrical configurations of the code reading device and the stand.

FIG. 5 is a block diagram illustrating a first example of electrical configurations of the code reading device and the stand. As illustrated in FIG. 5, the code reading device 1 includes a power receiving coil 18 and a battery 19, and the stand 7 includes a power transmitting coil 78. For example, the battery 19 is provided in the grip end placement portion 73, the power receiving coil 18 is provided in the grip end 13. When the code reading device 1 is placed on the stand 7 as illustrated in FIG. 4, the power transmitting coil 78 and the power receiving coil 18 come close to each other, and power is wirelessly transmitted from the power transmitting coil 78 to the power receiving coil 18. However, positions where the power receiving coil 18 and the power transmitting coil 78 are arranged are not limited to this example. In addition, the power received by the power receiving coil 18 is stored in the battery 19 and supplied from the battery 19 to each unit of the code reading device 1. That is, the illumination unit 2, the imaging unit 3, the controller 4, the display SP, and the like described above are operated by the power supplied from the battery 19. Note that a super capacitor (SCAP) may be used instead of the battery 19.

As illustrated in FIG. 5, a code reading system 8 including the code reading device 1 and the stand 7 includes a scanner system 81, a communication system 83, a setting system 85, and a communication unit 87 that communicates with the communication system 83. The scanner system 81 includes the illumination unit 2, the imaging unit 3, the controller 4, and the display SP described above, and is provided in the code reading device 1.

In the first example of FIG. 5, the communication system 83 is provided in the code reading device 1, and the communication unit 87 that communicates with the communication system 83 is provided in the stand 7. The communication system 83 includes the main communication interface 831 that communicates with a client computer C. The main communication interface 831 communicates with the client computer C in a wired or wireless manner during normal use in which the user uses the code reading device 1 to read the code attached to the surface Wf of the workpiece W.

Furthermore, the communication system 83 includes the first communication interface 833 that communicates with the client computer C. The first communication interface 833 communicates with the client computer C during a setting in which the client computer C performs a setting of the code reading device 1. The communication between the first communication interface 833 and the client computer C may be performed in either wired or wireless manner. However, here, an example in which the first communication interface 833 and the client computer C communicate with each other via a universal serial bus (USB) cable will be described. The first communication interface 833 has a function as a USB memory, and holds an RNDIS driver 834 in the USB memory. Therefore, when the client computer C and the first communication interface 833 are connected, the client computer C can access the USB memory of the first communication interface 833 and download the RNDIS driver 834. In addition, when the client computer C executes the RNDIS driver 834, communication by TCP/IP becomes possible between the client computer C and the first communication interface 833.

In addition, the communication system 83 includes the second communication interface 837. The second communication interface 837 is provided to communicate with a communication interface 871 of the communication unit 87 provided in an external unit different from the client computer C. In the example of FIG. 5, the communication unit 87 is provided on the stand 7, and the second communication interface 837 of the code reading device 1 can communicate with the communication unit 87 of the stand 7. The second communication interface 837 and the communication interface 871 communicate with each other by Bluetooth. However, a communication method between the second communication interface 837 and the communication interface 871 is not limited thereto.

In the first example of FIG. 5, the setting system 85 is provided in the code reading device 1. The setting system 85 includes an IP address assignment unit 851, a name resolution unit 853, and a web server 855. The IP address assignment unit 851 is a DHCP server, and assigns a private IP address to each of the client computer C and the web server 855 when the communication by TCP/IP between the first communication interface 833 and the client computer C becomes possible. As a result, the communication by TCP/IP is established between the client computer C and the web server 855 via a private network to which the client computer C and the web server 855 are connected. The name resolution unit 853 is a DNS server (specifically, an mDNS responder), and automatically converts the private IP address assigned to the web server 855 by the IP address assignment unit 851 into a predetermined domain. Therefore, as the domain is designated in a web browser WB of the client computer C, the web server 855 can be accessed from the web browser WB. Note that it is preferable to use the private network and the private IP address from the viewpoint of security, but a public network and a global IP address can also be used.

The web server 855 includes a configuration application 856. As described later, the configuration application 856 sets parameters (an imaging parameter Pa and a decoding parameter Pb) for the scanner system 81 to execute code reading and a communication parameter Pc for the main communication interface 831 to communicate with the client computer C. These parameters Pa, Pb, and Pc set by the configuration application 856 are stored in the storage unit 5.

In particular, the imaging parameter Pa and the decoding parameter Pb are stored for each bank B (FIG. 6). FIG. 6 is a view schematically illustrating a bank storing parameters. That is, a plurality of banks B(N) can be set in the storage unit 5 (N=1, 2, 3, and so on). The bank B(N) stores the imaging parameter Pa and the decoding parameter Pb. In other words, the plurality of banks B(N) indicating a plurality of parameter combinations in which at least one of the imaging parameter Pa and the decoding parameter Pb is different can be set in the storage unit 5. Then, when one bank among the plurality of banks B(N) is designated, the controller 4 executes code reading using the imaging parameter Pa and the decoding parameter Pb stored in the one bank.

Here, the imaging parameter Pa includes an illumination condition when the illumination unit 2 executes an illumination operation and an imaging condition when the imaging unit 3 executes an imaging operation. The illumination condition indicates any illumination mode in which the illumination unit 2 is caused to execute the illumination operation among the diffuse illumination by the diffuse illumination unit 27, the direct illumination by the direct illumination unit 28, and the polarized illumination by the polarized illumination unit 29. Furthermore, the illumination condition indicates brightness of the illumination light Li to be emitted by the illumination mode executed in the illumination operation. Note that the brightness of the illumination light Li can be changed stepwise by adjusting brightness of light to be emitted from the corresponding light source E, 281, or 291. The imaging condition indicates any camera of the cameras 31A and 31B in the imaging unit 3 to be used for the imaging unit 3 to execute the imaging operation. Furthermore, the imaging condition indicates an exposure time and a gain of the camera to be used in the imaging operation. In addition, the decoding parameter Pb includes a coefficient of a filter to be used in image processing for executing decoding.

Figure 7:
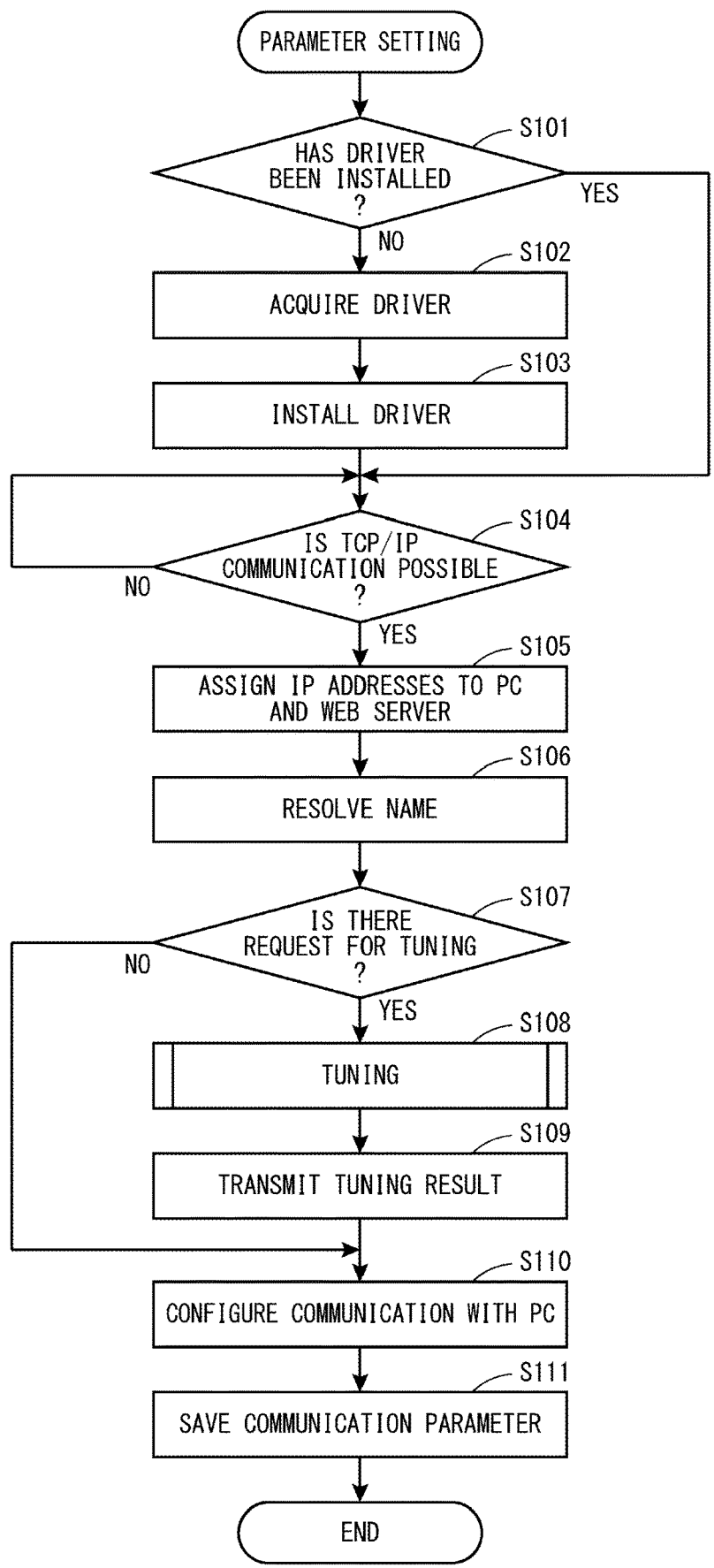
FIG. 7 is a flowchart illustrating an example of a parameter setting method.

FIG. 7 is a flowchart illustrating an example of a parameter setting method. In Step S101, the communication system 83 determines whether the first communication interface 833 is connected to the client computer C by the USB cable. It is determined whether the RNDIS driver has been installed when the first communication interface 833 is connected to the client computer C, and in a case where the RNDIS driver has not been installed ("NO" in Step S101), the first communication interface 833 operates as the USB memory, and the client computer C acquires the RNDIS driver via the first communication interface 833 (Step S102). The client computer C installs the acquired RNDIS driver 834 (Step S103). Steps S102 and S103 are skipped in a case where the RNDIS driver has been installed ("YES" in Step S101).

When the RNDIS driver 834 is installed in the client computer C that has downloaded the RNDIS driver 834, the communication by TCP/IP becomes possible between the client computer C and the first communication interface 833 ("YES" in Step S104). When the TCP/IP communication becomes possible in this manner, the IP address assignment unit 851 assigns a private IP address to each of the client computer C and the web server 855 (Step S105), and the name resolution unit 853 associates a predetermined domain name with the private IP address assigned to the web server 855 (Step S106). As a result, the user can access the web server 855 and operate the configuration application 856 included in the web server 855 by designating the domain through the web browser WB.

In Step S107, the configuration application 856 determines whether a tuning execution request has been received from the web browser WB. When confirming the reception of the tuning execution request ("YES" in Step S107), the configuration application 856 executes tuning (FIGS. 8 and 9).

Figure 8:
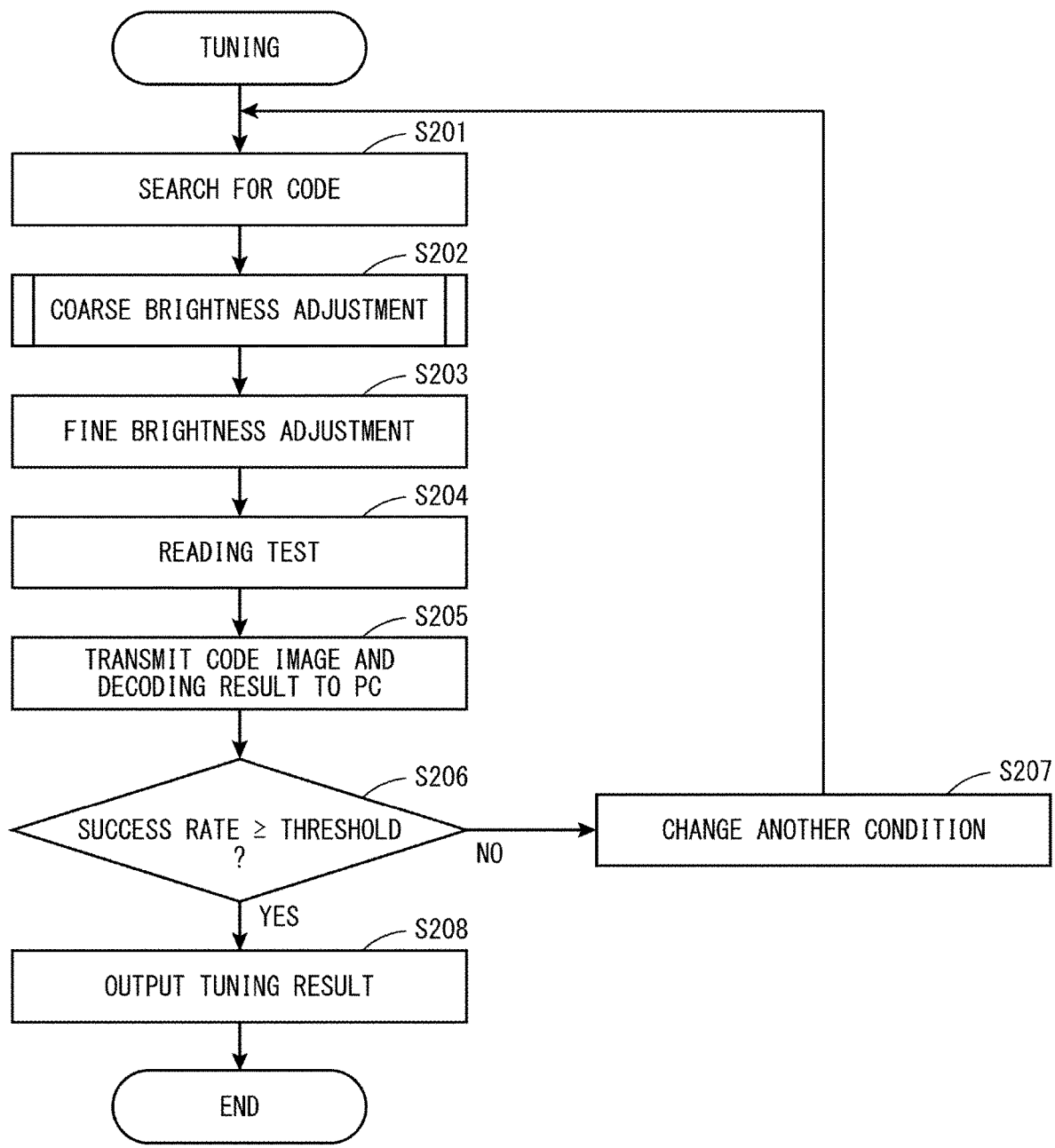
FIG. 8 is a flowchart illustrating an example of tuning.
Figure 9:
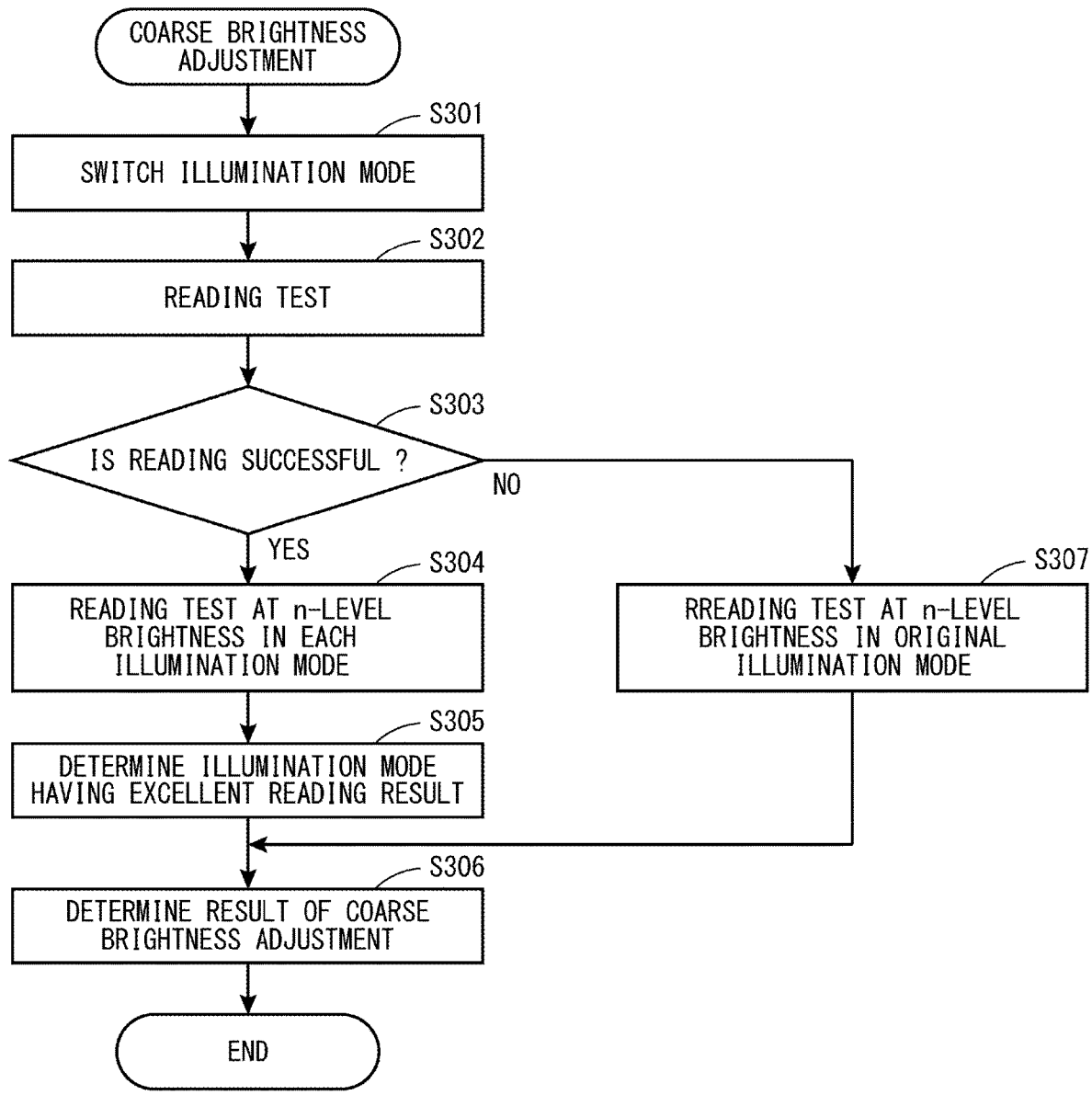
FIG. 9 is a flowchart illustrating an example of coarse brightness adjustment executed in the tuning.

FIG. 8 is a flowchart illustrating an example of the tuning, and FIG. 9 is a flowchart illustrating an example of coarse brightness adjustment executed in the tuning. In Step S201, the controller 4 (a tuning unit) searches for a code. Specifically, the controller 4 causes the imaging unit 3 to execute an imaging operation while causing the illumination unit 2 to execute an illumination operation, thereby acquiring the code image Ic. Furthermore, the controller 4 decodes the code image Ic to search for a code. This search for a code is executed using the imaging parameter Pa and the decoding parameter Pb set in the controller 4 at that time. That is, in Step S201, code reading is executed using the imaging parameter Pa and the decoding parameter Pb set at that time.

In Step S202, the controller 4 performs coarse brightness adjustment of the illumination light Li emitted by the illumination unit 2 (FIG. 9). As illustrated in FIG. 9, in Step S301, the controller 4 switches an illumination mode by setting an illumination mode different from the illumination mode used in the code search to the illumination unit 2. Further, the controller 4 executes a reading test in the switched illumination mode (Step S302). The reading test is code reading executed to adjust the parameters, and the reading test sequentially executes an illumination operation, an imaging operation, and decoding similarly to the code reading.

In Step S303, the controller 4 determines whether the reading test in Step S302 is successful. When the reading test is successful ("YES" in Step S303), the controller 4 executes the reading test at each brightness while gradually changing the brightness of the illumination light Li in each of the illumination mode before switching and the illumination mode after switching (Step S304). In Step SS305, the controller 4 determines an illumination mode having an excellent reading result out of the illumination mode before switching and the illumination mode after switching. For example, the illumination mode having a large number of times of success in the reading tests as a result of executing a plurality of the reading tests for each of the illumination modes while changing the brightness of the illumination light Li is determined to be the illumination mode having the excellent read result. In subsequent Step S306, the controller 4 determines, as a result of the coarse brightness adjustment, a median value of the brightness in each of the successful reading tests among the plurality of reading tests executed for the illumination mode having the excellent reading result. Further, the coarse brightness adjustment of FIG. 9 ends.

When it is determined in Step S303 that the reading test in Step S302 has failed ("NO" in Step S303), the controller 4 executes the reading test at each brightness while gradually changing the brightness of the illumination light Li in the illumination mode before switching (Step S307). In subsequent Step S306, the controller 4 determines a median value of the brightness in each of successful reading tests among the plurality of reading tests executed for the illumination mode before switching as a result of the coarse brightness adjustment. Further, the coarse brightness adjustment of FIG. 9 ends.

In this manner, in the coarse brightness adjustment of FIG. 9 (that is, Step S202 in FIG. 8), one appropriate illumination mode out of the illumination mode before switching and the illumination mode after switching and an appropriate brightness in the illumination mode are determined. When the coarse brightness adjustment (Step S202) is ended, the controller 4 performs fine brightness adjustment (Step S203). Specifically, the reading test is executed while changing a brightness of the illumination light Li emitted in one appropriate illumination mode within a predetermined range centered on the appropriate brightness. For example, a plurality of reading tests are executed for the same brightness, and the number of times of success in the reading test at the brightness is obtained. After the number of times of success is obtained for each brightness in this manner, a brightness with the maximum number of times of success is obtained as an optimum brightness.

In Step S204, the controller 4 executes the reading test a plurality of times while setting the brightness of the illumination light Li emitted in one appropriate illumination mode to the optimum brightness obtained in Step S203. At this time, the controller 4 transmits the code image Ic and the decoding result Rd acquired in each of the reading tests to the client computer C (Step S205). Specifically, the code image Ic and the decoding result Rd acquired by the controller 4 are transmitted to the client computer C via the first communication interface 833 by the configuration application 856. The client computer C displays the received code image Ic and decoding result Rd on the web browser WB.

In Step S206, the controller 4 determines whether a success rate of successful reading tests in the plurality of reading tests in Step S204 is equal to or more than a predetermined threshold. When the success rate of the reading test is less than the threshold ("NO" in Step S206), the controller 4 changes a condition other than the illumination condition, that is, the imaging condition of the imaging parameter Pa or the decoding parameter Pb (Step S207), and returns to Step S201. On the other hand, when the success rate of the reading test is equal to or higher than the threshold ("YES" in Step S206), the controller 4 outputs the imaging parameter Pa and the decoding parameter Pb set at that time as a tuning result (Step S206).

When the tuning (that is, Step S108 in FIG. 7) in FIG. 8 is completed in this manner, the configuration application 856 transmits the tuning result (the imaging parameter Pa and the decoding parameter Pb) output from the controller 4 to the client computer C via the first communication interface 833 (Step S109), and newly sets the bank B in the storage unit 5 to hold the imaging parameter Pa and the decoding parameter Pb indicated by the tuning result.

In subsequent Step S110, the configuration application 856 sets the communication parameter Pc for communication between the main communication interface 831 and the client computer C. Then, the controller 4 stores this communication parameter Pc in the storage unit 5 (Step S111) and transmits the communication parameter Pc to the client computer C. Note that the main communication interface 831 transmits the code image Ic and the decoding result Rd acquired by the controller 4 to the client computer C in accordance with the communication parameter Pc during the normal use of the code reading device 1.

Figure 10:
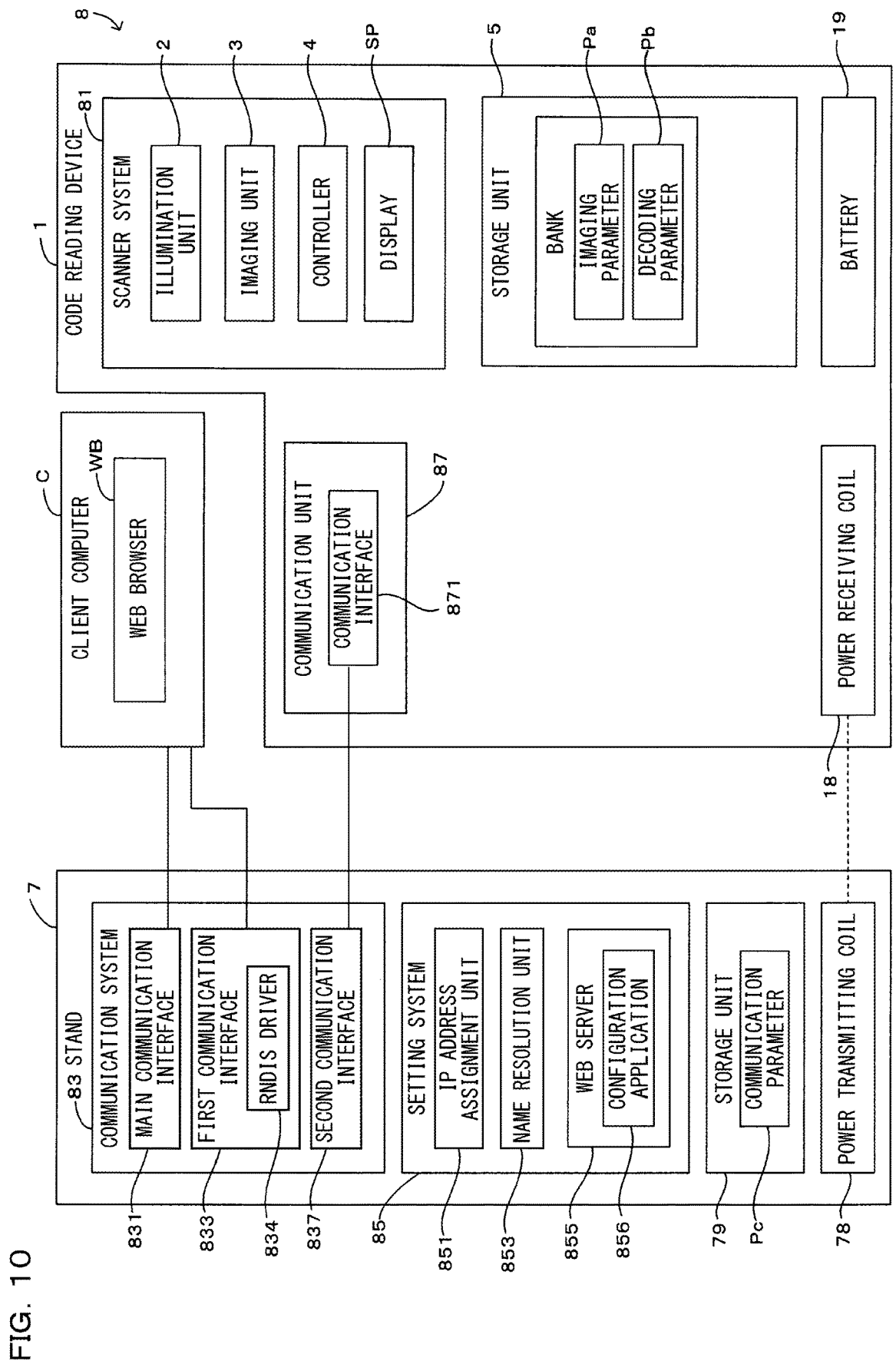
FIG. 10 is a block diagram illustrating a second example of the electrical configurations of the code reading device and the stand.

FIG. 10 is a block diagram illustrating a second example of the electrical configurations of the code reading device and the stand. Here, differences from the first example of FIG. 5 will be mainly described, and common points will be denoted by corresponding reference signs, and description thereof will be omitted as appropriate. In the second example of FIG. 10, the communication system 83 is provided on the stand 7 instead of the code reading device 1, and the communication unit 87 is provided on the code reading device 1 instead of the stand 7. In addition, the stand 7 includes a storage unit 79 that is a storage device such as a flash ROM, and the communication parameter Pc is stored in the storage unit 79. Furthermore, the setting system 85 is provided in the stand 7 instead of the code reading device 1.

In such a configuration, the code image Ic and the decoding result Rd acquired by the controller 4 of the code reading device 1 are transmitted to the client computer C via the main communication interface 831 of the stand 7 during the normal use. Specifically, the code image Ic and the decoding result Rd acquired by the controller 4 are transmitted to the second communication interface 837 of the communication system 83 of the stand 7 by the communication interface 871 provided in the communication unit 87 of the code reading device 1. Then, the main communication interface 831 transmits the code image Ic and the decoding result Rd received by the second communication interface 837 to the client computer C.

In addition, in the parameter setting method of FIG. 7, the imaging parameter Pa and the decoding parameter Pb are set from the web browser WB of the client computer C to the code reading device 1 via the stand 7. That is, the configuration application 856 of the web server 855 provided in the setting system 85 of the stand 7 communicates with the controller 4 via the second communication interface 837 and the communication interface 871. That is, when the request for tuning is confirmed in Step S107, the configuration application 856 transmits a tuning execution instruction to the controller 4 via the second communication interface 837 and the communication interface 871. When receiving the execution instruction, the controller 4 executes tuning (Step S108). In addition, the controller 4 outputs the imaging parameter Pa and the decoding parameter Pb acquired as a result of the tuning to the setting system 85 via the communication interface 871 and the second communication interface 837 (Step S207).

In addition, since the main communication interface 831 is provided in the stand 7, the communication parameter Pc for the main communication interface 831 to communicate with the client computer C is stored in the storage unit 79 of the stand 7. That is, the communication parameter Pc set in Step S110 is stored in the storage unit 79 (Step S111). A communication parameter for communication between the code reading device 1 and the stand 7 is stored in each of the code reading device 1 and the stand 7.

The code reading system 8 configured as described above includes the IP address assignment unit 851 that assigns a private IP address to each of the client computer C and the configuration application 856 which sets the imaging parameter Pa, the decoding parameter Pb, or the communication parameter Pc. Then, when the communication system 83 is connected to the client computer C via the first communication interface 833 (Steps S101 and S104), private IP addresses on the same private network are assigned to the client computer C and the web server 855, respectively, by the IP address assignment unit 851 (Step S105). In this manner, the communication between the client computer C and the web server 855 is automatically established. As a result, an instruction can be transmitted from the web browser WB of the client computer C to the configuration application 856 of the web server 855 to cause the configuration application 856 to set the imaging parameter Pa, the decoding parameter Pb, or the communication parameter Pc (Steps S108 and S110). As a result, it is possible to easily execute the setting for reading a code without requiring a high-level technique related to a network.

In addition, the configuration application 856 has a tuning mode for adjusting the imaging parameter Pa or the decoding parameter PB while displaying the code image Ic on the web browser WB via the first communication interface 833 (Step S205) in a state of being connected to the client computer C via the first communication interface 833 (Step S108 and FIG. 8). In such a configuration, the user can execute work for the setting in the tuning mode (Step S108 and FIG. 8) while confirming the code image Ic displayed on the web browser WB.

In addition, the configuration application 856 causes the controller 4 (a control unit) to decode the code image Ic captured by the imaging unit 3 in the state of being connected to the client computer C via the first communication interface 833, and causes the web browser WB to display the decoding result Rd obtained by the controller 4 via the first communication interface 833 (Step S205). In such a configuration, a display output of the decoding result Rd with respect to the web browser WB can be executed via the same first communication interface 833 that communicates the instruction from the web browser WB, and thus, it is not necessary to switch a communication interface to correspond to each case.

In addition, the configuration application 856 generates the plurality of banks B(N) respectively indicating the plurality of parameter combinations in which at least one of the imaging parameter Pa and the decoding parameter Pb is different, and stores the generated banks B(N) in the storage unit 5. On the other hand, the scanner system 81 causes the imaging unit 3 to generate the code image Ic using the imaging parameter Pa indicated by one bank designated from among the plurality of banks B(N), and causes the controller 4 to execute decoding of the code image Ic using the decoding parameter Pb indicated by the one bank. In such a configuration, the user can select the appropriate imaging parameter Pa and decoding parameter Pb according to a material of the workpiece W to which a code is attached, for example, by designating one bank from the plurality of banks B(N). Note that simple parameter change (bank designation or the like) by the user can be executed by operating the display SP, for example.

In addition, the code reading device 1 is a portable code reading device including the scanner system 81, the battery 19, and the second communication interface 837. On the other hand, in the second example of FIG. 10, the code reading system 8 includes the stand 7, and the stand 7 can receive data including the decoding result Rd output from the code reading device 1 via the second communication interface 837 and charge the battery 19. In addition, the configuration application 856 sets the imaging parameter Pa and the decoding parameter Pb in the code reading device 1, and sets the communication parameter Pc, related to an output of the decoding result Rd from the code reading device 1, in the stand 7. Further, the stand 7 outputs the decoding result Rd of the code reading device 1 to the client computer C (the external device) according to the communication parameter Pc. In such a configuration, it is possible to easily set the imaging parameter Pa and the decoding parameter Pb in the code reading device 1 and set the communication parameter Pc in the stand 7.

In addition, in the first example of FIG. 5, the code reading device 1 includes the name resolution unit 853 (the DNS server) for associating a predetermined domain name with a private IP address assigned to the web browser WB by the IP address assignment unit 851. Therefore, when a domain is designated from the web browser WB, the code reading device 1 can access the configuration application 856. In such a configuration, even in a case where an IP address dynamically changes every time the connection to the client computer C is established, the IP address is associated with a predetermined domain, and thus, the user can access the configuration application 856 from the web browser WB only by designating the domain without grasping the IP address.

Note that the IP address assignment unit 851 may assign a private IP address only to the client computer C connected via the first communication interface 833. In such a configuration, since the assignment of an IP address with respect to the client computer C connected by a communication interface (the main communication interface 831) other than the first communication interface 833 is prohibited, it is possible to easily and appropriately manage IP addresses on a private network.

As described above, in the present embodiment, the code reading system 8 corresponds to an example of an "information reading system" of the invention, the imaging unit 3 corresponds to an example of a "scanning unit" of the invention, the imaging parameter Pa corresponds to an example of a "scan parameter" of the invention, the code image Ic corresponds to an example of "scan data" of the invention, the client computer C corresponds to an example of an "external computer" of the invention, the controller 4 corresponds to an example of a "control unit" of the invention, the scanner system 81 corresponds to an example of a "scanner system" of the invention, the setting system 85 corresponds to an example of a "setting system" of the invention, the first communication interface 833 corresponds to an example of a "first communication interface" of the invention, the communication system 83 corresponds to an example of a "communication system" of the invention, the storage unit 5 or the storage unit 79 corresponds to an example of a "storage unit" of the invention, the web server 855 corresponds to an example of a "web server" of the invention, the IP address assignment unit 851 corresponds to an example of an "IP address assignment unit" of the invention, and the "battery 19" corresponds to an example of a "power storage unit" of the invention.

Note that the invention is not limited to the above-described embodiment and various modifications can be made to those described above without departing from the gist thereof. For example, the first example of FIG. 5 and the second example of FIG. 10 are not adopted alternatively, and both can be adopted together. That is, the communication system 83 and the setting system 85 can be provided in each of the code reading device 1 and the stand 7. In this case, the parameter setting of FIG. 7 may be performed in the manner described with reference to FIG. 5 when the client computer C is connected to the first communication interface 833 of the code reading device 1, and the parameter setting of FIG. 7 may be performed in the manner described with reference to FIG. 10 when the client computer C is connected to the first communication interface 833 of the stand 7.

In addition, the main communication interface 831 and the first communication interface 833 are not necessarily provided separately, and may be configured as a common communication interface. In addition, the client computer C may be divided into a configuration PC and an operation PC, and is not necessarily a PC but may be an industrial device such as a programmable logic controller (PLC).

At this time, for example, the client computer C determines whether a connection destination is the code reading device 1 or the stand 7. When the code reading device 1 is the connection destination, an instruction is issued to the configuration application 856 of the code reading device 1 so as to set the communication parameter Pc in the main communication interface 831 of the code reading device 1. On the other hand, when the stand 7 is the connection destination, an instruction is issued to the configuration application 856 of the stand 7 so as to set the communication parameter Pc in the main communication interface 831 of the stand 7. The configuration application 856 of the stand 7 automatically transfers a set parameter to the code reading device 1 via the second communication interface, and the set parameter is stored in the storage unit 5 via the configuration application 856 of the code reading device 1.

Figure 11:
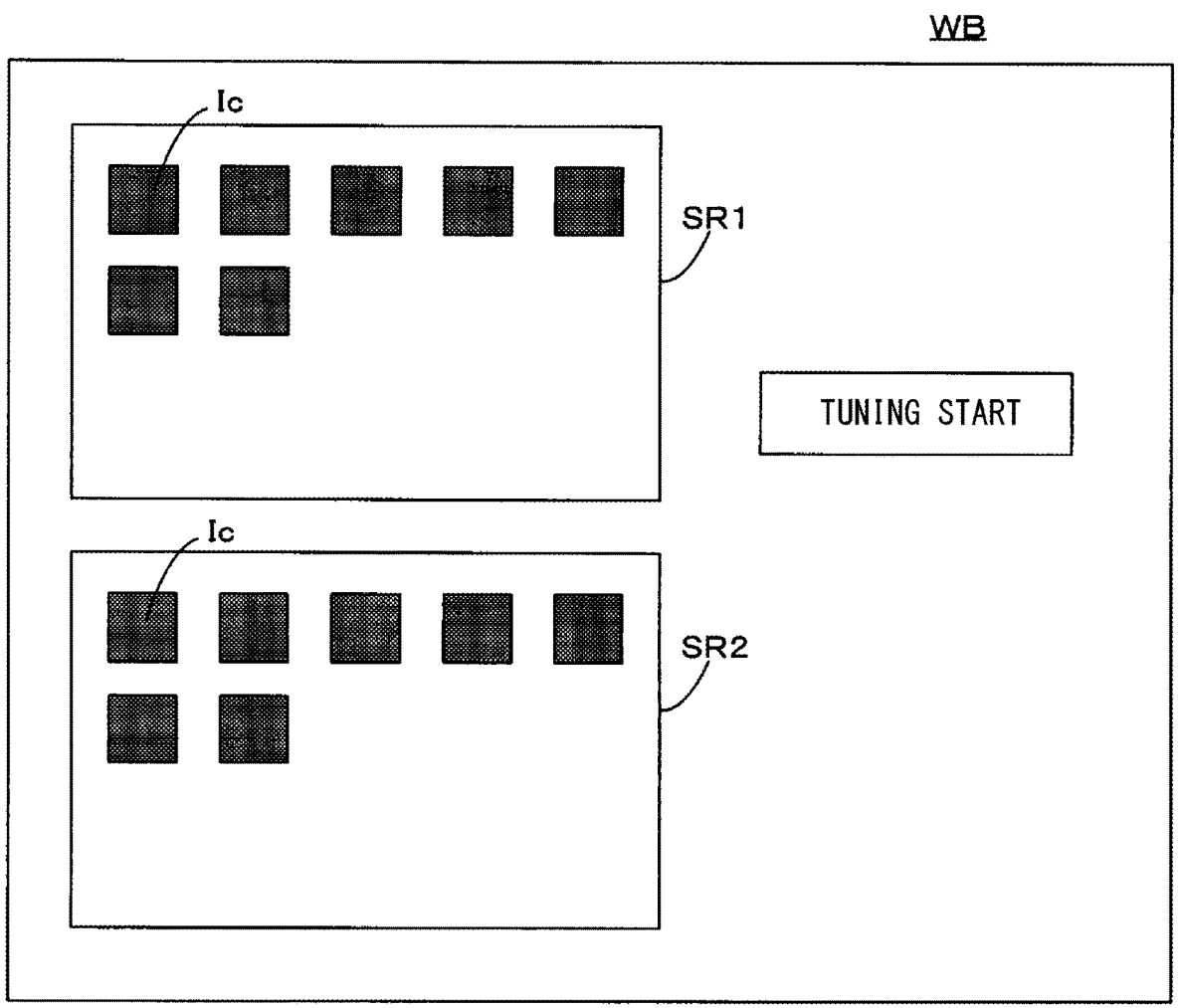
FIG. 11 is a view schematically illustrating a code image display mode in a web browser.

Meanwhile, the imaging unit 3 includes the high-resolution camera 31A and the low-resolution camera 31B. In this regard, in the tuning in Step S205 of FIG. 8, the configuration application 856 may transmit the code image Ic acquired by the camera 31A and the code image Ic acquired by the camera 31B to the client computer C via the first communication interface 833. As a result, the client computer C can display the two code images Ic on the web browser WB as illustrated in FIG. 11. FIG. 11 is a view schematically illustrating a code image display mode in the web browser. In the example of FIG. 11, a screen SR1 for the camera 31A and a screen SR2 for the camera 31B are provided side by side in the web browser WB. Then, the code image Ic acquired by the camera 31A is displayed on the screen SR1. The code image Ic acquired by the camera 31B is displayed on the screen SR2.

That is, in such an example, the imaging unit 3 includes the camera 31B (a first camera) and the camera 31A (a second camera) having higher resolution than the camera 31B. Further, the configuration application 856 displays the code image Ic (a first code image) captured by the camera 31B and the code image Ic (a second code image) captured by the camera 31A side by side in the web browser WB via the first communication interface 833 to make a comparison therebetween. In such a configuration, the user can easily compare the low-resolution code image Ic obtained by the camera 31B with the high-resolution code image Ic obtained by the camera 31A using the web browser WB.

Figure 12:
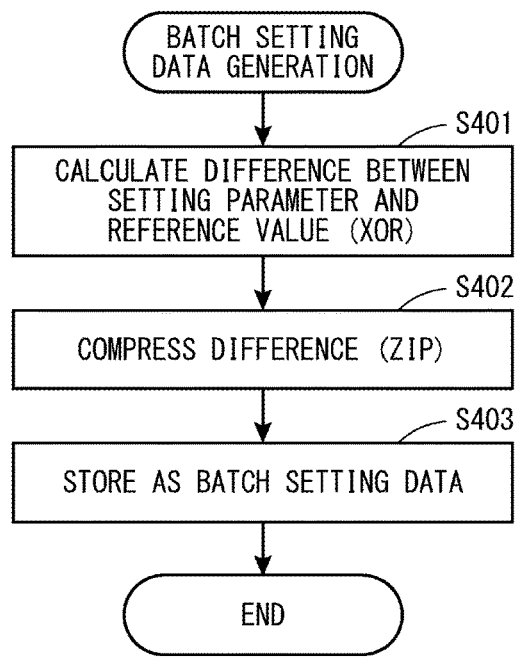
FIG. 12 is a flowchart illustrating an example of a method for generating batch setting data.

In addition, a result of the parameter setting in FIG. 7 can be compressed as batch setting data. FIG. 12 is a flowchart illustrating an example of a method for generating the batch setting data. In this example, the storage unit 5 of the code reading device 1 stores initial values (reference values) indicating defaults of the imaging parameter Pa, the decoding parameter Pb, and the communication parameter Pc, respectively. Further, in Step S401, the configuration application 856 calculates a difference between a parameter (set parameter) set according to the parameter setting in FIG. 7 and the initial value. Specifically, the configuration application 856 calculates an exclusive OR (XOR) of the set parameter and the initial value. Furthermore, the configuration application 856 performs data compression of the difference calculated in Step S401 by, for example, ZIP (Step S402). Further, the difference compressed in Step S402 is stored in the storage unit 5 as the batch setting data (Step S403). As a result, a size of data having no difference between the set parameter and the reference value can be greatly compressed.

In this example, the storage unit 5 provided in the code reading device 1 stores the initial values (reference values) indicating the defaults of the imaging parameter Pa, the decoding parameter Pb, and the communication parameter Pc, respectively. Further, the configuration application 856 extracts only a parameter having a value different from the initial value among the generated imaging parameter Pa, decoding parameter Pb, and communication parameter Pc (Step S401), and stores only the extracted parameter in the storage unit (Step S403). In such a configuration, the amount of data to be stored in the storage unit 5 can be suppressed. In particular, in a case where an encoded image (for example, a QR code (registered trademark)) obtained by encoding the extracted parameter is generated, there is an advantage that a size of the encoded image can be reduced.

Figure 13:
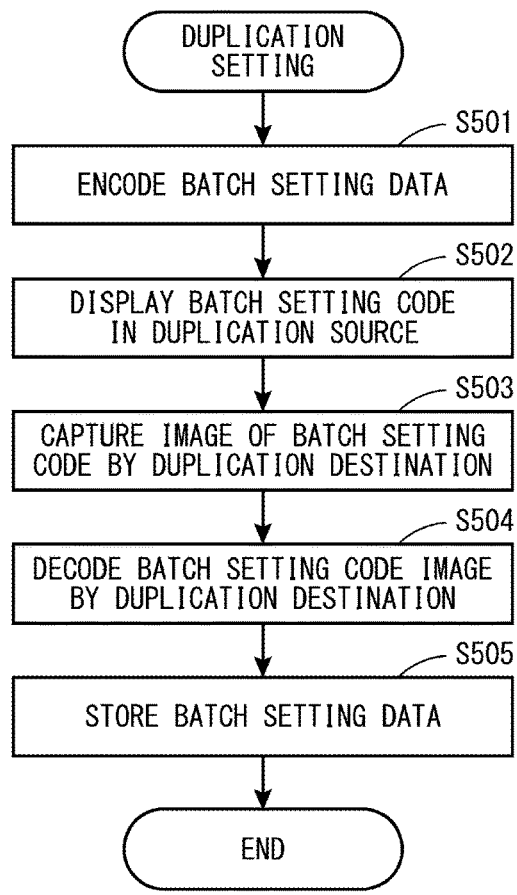
FIG. 13 is a flowchart illustrating an example of a duplication setting using batch setting data.
Figure 14:
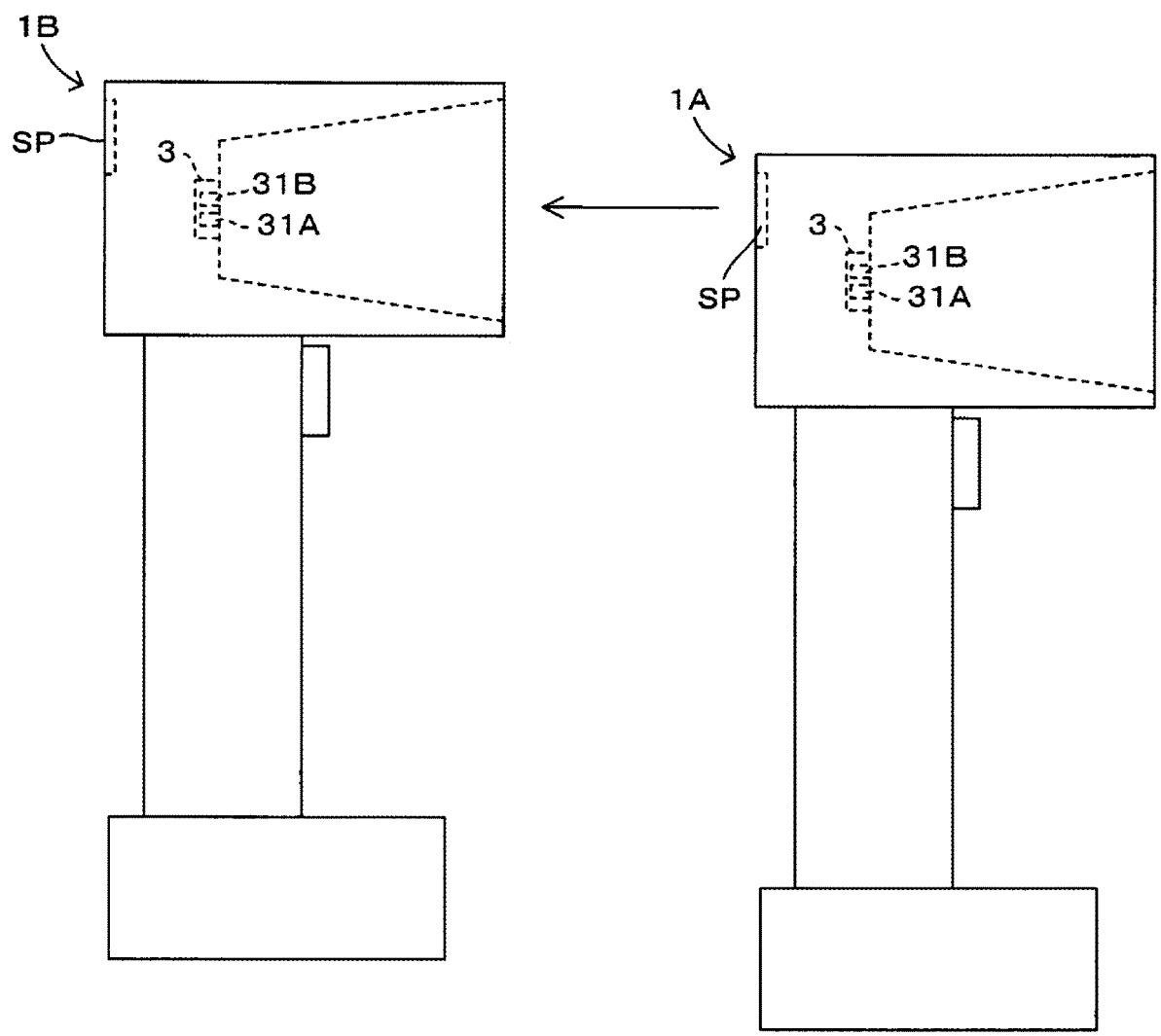
FIG. 14 is a view schematically illustrating an operation in the duplication setting.

Next, a usage form of an encoded image obtained by encoding batch setting data will be described. FIG. 13 is a flowchart illustrating an example of a duplication setting using batch setting data, and FIG. 14 is a view schematically illustrating an operation in the duplication setting. In this duplication setting, set parameters set in a code reading device 1A of FIG. 14 are set in a code reading device 1B different from the code reading device 1A.

In Step S501, batch setting data generated by the flowchart of FIG. 12 and stored in the storage unit 5 is encoded by the controller 4 to generate an encoded image (a setting code). In Step S502, in the code reading device 1A serving as a duplication source, the controller 4 causes the display SP to display the encoded image (Step S502). In Step S503, the imaging unit 3 of the code reading device 1B as a duplication destination captures the encoded image displayed in Step S502 and acquires the code image Ic of the encoded image. In Step S504, in the code reading device 1B, the controller 4 decodes the code image Ic to restore the batch setting data. In Step S505, the restored batch setting data is stored in the storage unit 5 of the code reading device 1B. The batch setting data may be compressed by ZIP or the like. In this case, in the code reading device 1B, the controller 4 decompresses the compressed data, restores the batch setting data, and stores the batch setting data in the storage unit 5.

Since an area of the display SP of the code reading device 1 is smaller than that of an opening portion 12 of the head 11, it is difficult to display a plurality of encoded images at a time. Therefore, it is necessary to sequentially display the plurality of encoded images on the display SP in a case where a size of batch setting data cannot be contained in one encoded image. That is, since necessary encoded images can be reduced by compressing the batch setting data as described above, a load at the time of decoding can be reduced in the code reading device 1B. In addition, the code reading device 1A may be caused to display an encoded image not only on the display SP but also on a display of a device having a small screen size such as a smartphone or an external device such as a PC, the code reading device 1B may be caused to read the encoded image to restore batch setting data, and the storage unit of the code reading device 1B may be caused to store the batch setting data.

In such an example, the imaging parameter Pa, the decoding parameter Pb, or the communication parameter Pc set by the code reading device 1A (a first code reading device) can be easily reflected in the code reading device 1B (a second code reading device). As a result, it is possible to easily execute the setting for reading a code without requiring a high-level technique related to a network.

Since the information reading system according to the present embodiment uses a web function, connection management (such as network-session-command response) between the web server and an external computer can be performed. In addition, a network is easily disconnected since a CPU is in a busy state during tuning of the information reading system, but data that is being tuned can be stored in a cache of the web browser or a database (such as ab SSD) of the external computer, and thus, the data is easily restored at the time of next connection to the network. Furthermore, the information reading system can compress the configuration application by ZIP or the like, decompress and expands the configuration application when being accessed from the web browser, and display the configuration application on the web browser, and thus, a data size held by the information reading system can be reduced.

The invention is applicable to all techniques for performing a setting for reading information included in a target to be read by scanning the target to be read to generate scan data and decoding the scan data.

What is claimed is:

1. An information reading system comprising:
   a scanner system including a scanning unit that scans a target to be read and generates scan data and a control unit that executes decoding of the scan data generated by the scanning unit;
   a setting system that performs a setting in the scanner system;
   a communication system including a first communication interface to be connected to an external computer; and
   a storage unit that stores a scan parameter for controlling the scanning unit, a decoding parameter related to the decoding to be executed on the scan data, or a communication parameter related to a result output of the decoding executed on the scan data, wherein
   the setting system includes
      a web server that executes a configuration application for setting the scan parameter, the decoding parameter, or the communication parameter, and
      an IP address assignment unit that assigns an IP address on an identical network to each of the external computer and the web server when the communication system is connected to the external computer via the first communication interface,
   the web server is brought into a state of being capable of communicating with a web browser of the external computer via the first communication interface after the assignment of the IP address by the IP address assignment unit, and
   the configuration application stores the scan parameter, the decoding parameter, or the communication parameter in the storage unit in response to an instruction received from the web browser via the first communication interface.

2. The information reading system according to claim 1, wherein the configuration application has a tuning mode for adjusting the scan parameter or the decoding parameter while causing the web browser to display the scan data via the first communication interface in a state of being connected to the external computer via the first communication interface.

3. The information reading system according to claim 1, wherein the configuration application causes the control unit to execute the decoding of the scan data scanned by the scanning unit and causes the web browser to display a result of the decoding by the control unit via the first communication interface in a state of being connected to the external computer via the first communication interface.

4. The information reading system according to claim 1, wherein
   the scanning unit includes a first camera and a second camera different from the first camera in terms of at least any of a visual field, resolution, and a focal length, and
   the configuration application causes, via the first communication interface, the web browser to display a first code image obtained by capturing an image of a code as the target to be read with the first camera and a second code image obtained by capturing an image of the code with the second camera in a comparable manner.

5. The information reading system according to claim 1, wherein
   the configuration application stores a bank including a scan parameter and a decoding parameter in the storage unit, and
   the scanner system causes the scanning unit to generate scan data according to the scan parameter indicated by the bank, and causes the control unit to decode the scan data according to the decoding parameter indicated by the bank.

6. The information reading system according to claim 1, further comprising:
   an information reading device that is a portable type and includes the scanner system, a power storage unit, and a second communication interface; and
   a stand configured to receive data including a result of decoding output from the information reading device via the second communication interface and charge the power storage unit, wherein
   the configuration application sets the scan parameter and the decoding parameter in the information reading device and sets a communication parameter related to the output of the result of the decoding by the information reading device in the stand, and
   the stand outputs the result of the decoding by the information reading device to an external device according to the communication parameter.

7. The information reading system according to claim 1, wherein
   the setting system further includes a name resolution unit that automatically associates a predetermined domain name with an IP address assigned to the information reading device by the IP address assignment unit, and
   the web browser is capable of receiving designation of the domain and accessing the configuration application using the IP address associated with the domain name by the name resolution unit.

8. The information reading system according to claim 1, wherein the IP address assignment unit assigns the IP address only to the external computer connected via the first communication interface.

9. The information reading system according to claim 1, wherein
   the storage unit stores reference values of the scan parameter, the decoding parameter, and the communication parameter, and
   the configuration application extracts only a parameter having a value different from the reference value among the scan parameter, the decoding parameter, and the communication parameter, and stores only the extracted parameter in the storage unit.

10. A method for setting an information reading system using a plurality of the information reading systems according to claim 1, the information reading system being a portable information reading device that includes a head housing the scanning unit and a display unit provided in the head, the plurality of information reading systems including a first information reading device and a second information reading device, the method comprising:

a step of generating a setting code by causing the control unit of the first information reading device to encode the scan parameter, the decoding parameter, or the communication parameter set by the configuration application of the first information reading device;

a step of causing the display unit of the first information reading device to display the generated setting code;

a step of causing the scanning unit of the second information reading device to scan the setting code displayed on the display unit of the first information reading device to generate scan data;

a step of causing the control unit of the second information reading device to decode the scan data; and a step of causing the storage unit of the second information reading device to store the decoded scan parameter, decoding parameter, or communication parameter of the first information reading device.

11. The method for setting the information reading system according to claim 10, wherein the storage unit stores reference values of the scan parameter, the decoding parameter, and the communication parameter, the head is provided with an opening portion configured for execution of scanning by the scanning unit, an area of the display unit is smaller than an area of the opening portion, and the step of generating the setting code further includes a step of extracting only a parameter having a value different from the reference value among the scan parameter, the decoding parameter, and the communication parameter by the configuration application of the first information reading device to acquire difference data as data to be encoded by the control unit of the first information reading device, and generating compressed data obtained by compressing the difference data.

12. A method for setting a scanner system that performs a setting using a setting system for a scanner system including a scanning unit that scans a target to be read and generates scan data and a control unit that decodes the scan data generated by the scanning unit, the method comprising:

a step of assigning, by an IP address assignment unit, an IP address on an identical network to each of a web server and an external computer after a first communication interface of a communication system is connected to the external computer, the web server being capable of executing a configuration application that sets a scan parameter for controlling scanning by the scanning unit, a decoding parameter related to decoding to be executed on the scan data, or a communication parameter related to a result output of the decoding executed on the scan data;

a step of bringing the web server into a state of being capable of communicating with a web browser of the external computer via the first communication interface after the assignment of the IP address by the IP address assignment unit; and a step of storing, by the configuration application, the scan parameter, the decoding parameter, or the communication parameter in a storage unit in response to an instruction received from the web browser via the first communication interface.

* * * * *